2,721,801
MANUFACTURE OF PAPER FOR PHOTOGRAPHIC PURPOSES

George R. Clark and William J. Priest, Rochester, N. Y., assignors to Eastman Kodak Company, Rochester, N. Y., a corporation of New Jersey No Drawing. Application January 25, 1951, Serial No. 207,862

4 Claims. (Cl. 95—8)

This invention relates to the manufacture of paper for photographic purposes which involves coating the paper with a baryta coating including therein a water-dispersible polymer having no aliphatic unsaturation.

It is well-known procedure in the art of making photographic papers to provide a paper support coated with baryta and a binder upon which is deposited a light-sensitive silver halide emulsion layer. The over-all physical and chemical characteristics of the sensitive paper are reflections of the quality of the sensitive emulsion layer, the baryta coating used, and the paper stock carrying those layers. For example, physical irregularities present on the surface of a baryta-coated paper are reflected and ofttimes magnified in subsequent sensitizing and processing operations, partly because these defects prevent the application of a uniform emulsion layer during the sensitizing operation. It is, therefore, desirable to apply a baryta composition to paper in a uniform and constant manner so that maximum quality of product can be assured. Also, it is desirable that the coating thus applied be of superior flexibility.

There are many drawbacks to baryta coatings or compositions prepared with the common binders or vehicles, usually gelatin. Some of these drawbacks are:

1. High viscosities adding to the difficulty of air-knife or brush machine coating.
2. Change in viscosity of the composition over a period of time.
3. High water absorption of the resultant coatings.
4. Brittleness of the coated sheet.
5. Yellow color may be present in the gelatin after use.
6. Non-uniformity in the baryta coatings.

One object of our invention is to provide a baryta coating composition which is more stable as regards viscosity than compositions for this purpose which are known at the present time. Another object of our invention is to provide baryta coating compositions in which the solids content is higher than was formerly the case. A still further object of our invention is to provide a baryta-coated paper which when sensitized has less curl and virtually no cracking when compared with baryta-coated papers heretofore available. A still further object of our invention is to provide a baryta coating composition for paper in which polymers having no aliphatic unsaturation are employed. Other objects of our invention will appear herein.

These objects are accomplished by substituting for the gelatin or other binder ordinarily employed in baryta coating either in whole or in part a latex of a polymer in which all aliphatic carbons present are saturated. Some of the water-dispersible polymers whose latices are suitable for different purposes are the following:

1. Styrene-butylacrylate polymer
2. Polyethylacrylate
3. Polymethylacrylate
4. Vinylacetate-ethylacrylate polymer
5. Polyvinylacetate
6. Styrene-butylmethacrylate polymer
7. Styrene-octylmethacrylate polymer We have found that by this substitution the objects listed above are obtained particularly where 25% or more of the binder for the pigment therein in the baryta coating composition is replaced with one of the polymers listed. We have found that baryta coatings in accordance with our invention have good keeping qualities, exhibit no adverse effects upon the sensitive qualities of the emulsion and exhibit much better flexibility when coated on paper than does paper having a regular baryta coating thereon.

The latex which is employed in accordance with our invention may be prepared by an emulsion polymerization method such as the following:

An aqueous mixture was prepared consisting of 5400 parts of water, 16 parts of potassium persulfate, 250 parts of a 20% aqueous solution of a sodium alkyl aryl polyether sulfonate known as Triton X–200, 75 parts of sodium sulfate decahydrate. A mixture of 2700 parts of butyl acrylate and 2700 parts of styrene known as the "oil phase" also was prepared. The aqueous mixture was placed in a stainless steel vessel equipped with a stirrer and the temperature was brought to about 110° F. 1000 parts of oil phase was added together with 35 parts of a solution made by dissolving 50 parts of sodium bisulfite in 150 parts of water. After polymerization begins, the temperature is maintained within the range of 45–49° C. by the proper adjustment of cooling water applied to the sides of the vessel in which the action takes place. The balance of the oil phase was added at the rate of about 25 parts per minute and the balance of the sodium bisulfite solution was added in equal increments throughout the course of the polymerization. The action was run for a sufficient time to assure the formation of a good latex which was filtered and was suitable for use in preparing baryta compositions.

After the latex is prepared it is mixed with a suspension of blanc fixe, either as the sole binder for the blanc fixe or together with some other binder such as gelatin, the resin of the latex constituting at least 25% (based on dry weight) of the binder present in the baryta coating composition. The proportion of binder to pigment which is employed many vary from 1:3 up to 1:17. Also, a hardener may be included in the baryta composition which acts to increase the resistance of the coating to water. Formaldehyde has been found to be satisfactory in this connection and the proportion of hardener being not critical, it may be used in the amount desired by the individual operator. Other hardeners which may be employed are glyoxal, water-soluble melamine-formaldehyde resin, water-soluble urea-formaldehyde resin, or the like.

We have found that in accordance withour invention baryta coating compositions of as much as 70% of solids have been prepared, and the resulting coatings therefrom give a satisfactory surface to paper with only one coating operation. We have found that solids of this proportion can be employed in baryta coating compositions in accordance with our invention using a viscosity of no more than 5–10 centipoises. We have also found that the baryta coating compositions so prepared have good viscosity stability in that the compositions can stand for a time of 24 hours or even longer without interfering with the coating properties of the composition in contrast to some other types of baryta coating compositions. Baryta coatings are usually applied in sufficient thickness to give a weight of 10–60 g. of coating per square meter of paper, although this value may vary with different coating operations. The baryta composition is applied to the paper either by means of an air-knife, by means of a brush machine, or by any other conventional coating machine. After the coating has been applied to the paper it is then dried thereon such as by festooning the paper in a warm, dry atmosphere.

The following example illustrates our invention: A baryta coating composition was prepared as follows:

182 pounds of blanc fixe (55% solids) in which a small proportion of sodium hexa-metaphosphate is present is placed in a vessel and mixed with 16 pounds, 10 ounces of a 45% aqueous dispersion of styrene-butyl acrylate resin, 2.5 pounds gelatin which had been dissolved in warm water, and 230 cc. of 40% formaldehyde. The mass was thoroughly mixed and water was added so as to make a composition having approximately 50% of solids. After thorough mixing the mass was milled to assure uniformity of the dispersion of blanc fixe in the liquid mass. The composition thus prepared was then coated out onto paper in the form of a thin layer which paper was then dried by means of a current of warm, dry air. The resulting paper was then susceptible to coating with a photosensitive silver halide emulsion, such as an emulsion essentially consisting of silver halide grains suspended in gelatin. The resulting paper has good whiteness and is especially resistant to folding and curl as compared with paper coated with regular baryta. The preparation of latex as employd in our invention may be in accordance with the emulsion polymerization methods which are described in the prior art, the polymerization being carried out in the presence of wetting agents so that the resin particles are in finely divided form and are well dispersed in the liquid mass.

Instead of using styrene-butyl acrylate resin, latices of other resins may be prepared in a manner similar to that described and such latices may be employed in preparing the baryta coating composition. Some of the resins, the latices of which are useful in this connection, are polyethylacrylate, polymethylacrylate, the polymer of vinylacetate and ethylacrylate, polyvinylacetate, the polymer of styrene and butylmethacrylate, and the polymer of styrene and octylmethacrylate.

Some of the advantages of the compositions in accordance with our invention are:

1. The percent solids which can be coated are 10–15% higher than is possible with gelatin, starch or polyvinyl alcohol.
2. The flow characteristics of the composition are excellent.
3. The surface of the coated sheet is very smooth and exhibits high gloss.
4. The baryta coating is very white.
5. The baryta is extremely resistant to the effects of ultra-violet light and aging.
6. The flexibility and curl characteristics of the sheet are very good.

The curl characteristics of a paper are determined by conditioning a 10 centimeter disc of the paper, which has been baryta coated and then coated with photographic emulsion, at 18% relative humidity and 70° F. until equilibrium is reached (usually 24 hours) and then measuring the shortest distance from any two edges and subtracting this value from 10. The less the curl number, the better the resistance to curl of the paper tested. Samples of photographic paper were thus tested using, in one case, a sample which had been baryta coated in accordance with our invention and using, in the other, a baryta composition in which gelatin is the sole binder. Five samples of each type of paper were thus tested and whereas using a baryta composition in accordance with our invention, the curl was 2.4, when the test was repeated using a good grade of photographic paper in which a gelatin baryta coating had been employed, a value of 5.1 was obtained, these values in each case being the average of those by the 5 samples tested.

To determine the cracking characteristics of a baryta-coated paper after the emulsion coating has been applied thereto, an inch-wide strip of the baryta-coated and emulsion-coated paper is conditioned at 18% R. H. for a sufficient time to reach equilibrium. This strip of paper is then run over a one-inch mandrel. The cracks per inch are counted, the data given below being the average of a testing of 15 samples in each case. The paper prepared in accordance with our invention was entirely free of cracks, whereas with a gelatin baryta composition testing thereof showed an average of 3.7 cracks per inch. If this test is run under more severe conditions than given, it will be found that the margin between the value of the gelatin-coated paper and that coated in accordance with our invention is even greater.

The baryta-coated paper in accordance with our invention is more resistant to the effects of ultra-violet light than coatings wherein some other binder is employed. This is tested by taking a sample of the baryta-coated paper and exposing part of it for a given period of time, usually an hour, to ultra-violet light. The difference in percent reflectance of light between the exposed and the unexposed section is regarded as a measure of the yellowing characteristics of the baryta layer. The more yellowing which occurs, the larger the number which will be obtained. It was found that the yellowing of baryta coatings in accordance with our invention when so-treated with ultra-violet light are on the order of 1%, whereas with those in which gelatin is employed as the binder in the baryta composition a value upon testing in this manner of at least 2% is obtained.

Although the example shows the use of sodium hexametaphosphate as the dispersing agent for the blanc fixe, obviously any other dispersing agent might be employed in this connection. For instance, the ammonated copolymer of vinyl acetate and maleic anhydride as described and claimed in U. S. application No. 123,506 of William F. Fowler, Jr. is useful for this purpose. The resins which have been found to be more suitable for baryta coating compositions of the type described here are those in which the polymer has no unsaturated aliphatic carbons, as is illustrated by the resins which are listed herein as being of value for this purpose.

Although our invention has been described in terms of the use of individual polymers in preparing the baryta compositions, in some cases it may be desirable to employ mixtures of these polymers for that purpose. As the polymers described herein as being suitable for this purpose are compatible with each other, any combination of two or more of those polymers may be employed instead of just the single polymer.

We claim:

1. A method of preparing paper adapted for use for photographic purposes which comprises applying to the surface of the paper which is to receive the photographic emulsion layer an aqueous dispersion of barium sulfate in a binder composition of gelatin and polymer which polymer is selected from the group consisting of styrene-butyl acrylate polymer, polyethylacrylate, polymethylacrylate, vinylacetate-ethylacrylate polymer, polyvinyl acetate, styrene-butylmethacrylate polymer and styrene-octylmethacrylate polymer, the polymer constituting at least 25% and not more than approximately 75% of the mixture of gelatin and polymer, the proportion of binder to pigment in the dispersion being 1:3 to 1:17 which dispersion contains 50–70% of solids, and drying the barium sulfate-binder layer which was applied to the paper.

2. A method of preparing a paper adapted for use for photographic purposes which comprises applying to the surface of the paper to which a photographic emulsion layer is to be applied, an aqueous dispersion of barium sulfate in a binder composition essentially consisting of gelatin and styrene-butyl acrylate polymer, the proportion of binder to barium sulfate being within the range of 1:3 to 1:17, the dispersion containing 50–70% of solids and the styrene-butyl acrylate polymer constituting at least approximately 25% and not more than approximately 75% of the gelatin-polymer and drying the barium sulfate binder layer which was applied to the paper.

3. A method of preparing a paper adapted for use for photographic purposes which comprises applying to the surface of the paper upon which a photographic emulsion layer is to be applied, a coating of an aqueous dispersion of barium sulfate in a binder composition of approximately 75% styrene-butyl acrylate polymer and approximately 25% of gelatin, the ratio of binder composition to barium sulfate being within the range of 1:3 to 1:17, the aqueous dispersion containing 50–70% of solids, and drying the barium sulfate-binder layer which was applied to the paper.

4. A photographic paper consisting of a paper base, a coating applied to one side thereof of barium sulfate in a binder essentially consisting of approximately 75% of styrene-butyl acrylate polymer and approximately 25% of gelatin and thereover a photographic silver halide emulsion layer.

References Cited in the file of this patent

UNITED STATES PATENTS

| | | |
|---|---|---|
| 1,623,522 | Bent | Apr. 5, 1923 |
| 1,933,052 | Fikentscher et al. | Oct. 31, 1933 |
| 2,537,114 | Young | Jan. 9, 1951 |
| 2,583,274 | Niles | Jan. 22, 1952 |